US007550075B2

(12) United States Patent
Bertram et al.

(10) Patent No.: US 7,550,075 B2
(45) Date of Patent: Jun. 23, 2009

(54) REMOVAL OF CONTAMINANTS FROM A FLUID

(75) Inventors: Ronald Thomas Bertram, Gilbert, AZ (US); Douglas Michael Scott, Gilbert, AZ (US)

(73) Assignee: Tokyo Electron Ltd. (JP)

( * ) Notice: Subject to any disclaimer, the term of this patent is extended or adjusted under 35 U.S.C. 154(b) by 298 days.

(21) Appl. No.: 11/088,339

(22) Filed: Mar. 23, 2005

(65) Prior Publication Data

US 2006/0213820 A1 Sep. 28, 2006

(51) Int. Cl.
*B01D 35/14* (2006.01)

(52) U.S. Cl. ...................... 210/96.1; 210/134; 210/143; 210/254; 96/397

(58) Field of Classification Search ................. 210/745, 210/96.1, 96.2, 134, 143, 254; 96/397
See application file for complete search history.

(56) References Cited

U.S. PATENT DOCUMENTS 2,439,689 A 4/1948 Hyde et al.
2,617,719 A 11/1952 Stewart
2,873,597 A 2/1959 Fahringer ........................ 68/5
2,993,449 A 7/1961 Harland ....................... 103/87
3,135,211 A 6/1964 Pezzillo ....................... 103/87
3,642,020 A 2/1972 Payne
3,646,948 A 3/1972 Athey ....................... 134/57 D
3,890,176 A 6/1975 Bolon
3,900,551 A 8/1975 Bardoncelli et al.
4,018,812 A 4/1977 Hayashi et al. ............. 260/468
4,219,333 A 8/1980 Harris
4,341,592 A 7/1982 Shortes et al.
4,349,415 A 9/1982 DeFilippi et al.
4,475,993 A 10/1984 Blander et al.
4,618,769 A 10/1986 Johnson et al. ............. 250/338
4,730,630 A 3/1988 Ranft ......................... 134/111
4,749,440 A 6/1988 Blackwood et al.
4,827,867 A 5/1989 Takei et al. ................... 118/64
4,838,476 A 6/1989 Rahn
4,877,530 A 10/1989 Moses
4,879,004 A 11/1989 Oesch et al.
4,923,828 A 5/1990 Gluck et al.

(Continued)

FOREIGN PATENT DOCUMENTS

DE 39 04 514 C2 8/1990

(Continued)

OTHER PUBLICATIONS

J.B. Rubin et al. "A Comparison of Chilled DI Water/Ozone and Co2-Based Supercritical Fluids as Replacements for Photoresist-Stripping Solvents", IEEE/CPMT Int'l Electronics Manufacturing Technology Symposium, 1998, pp. 308-314.

(Continued)

*Primary Examiner*—Terry K Cecil
(74) *Attorney, Agent, or Firm*—Haverstock & Owens LLP

(57) ABSTRACT

A method and apparatus for removing contaminants from a fluid are disclosed. The fluid is introduced into a decontamination chamber such that the fluid is cooled and contaminants fall out within the decontamination chamber, producing a purified fluid. The purified fluid is then retrieved and can be used in a supercritical processing system.

19 Claims, 4 Drawing Sheets

U.S. PATENT DOCUMENTS

| | | | | |
|---|---|---|---|---|
| 4,925,790 | A | 5/1990 | Blanch et al. | |
| 4,933,404 | A | 6/1990 | Beckman et al. | |
| 4,944,837 | A | 7/1990 | Nishikawa et al. | |
| 5,011,542 | A | 4/1991 | Weil | |
| 5,013,366 | A | 5/1991 | Jackson et al. | |
| 5,028,219 | A | 7/1991 | Schuetz et al. | 417/423.4 |
| 5,068,040 | A | 11/1991 | Jackson | |
| 5,071,485 | A | 12/1991 | Matthews et al. | |
| 5,091,207 | A | 2/1992 | Tanaka | |
| 5,105,556 | A | 4/1992 | Kurokawa et al. | |
| 5,158,704 | A | 10/1992 | Fulton et al. | |
| 5,169,408 | A | 12/1992 | Biggerstaff et al. | 29/25.01 |
| 5,174,917 | A | 12/1992 | Monzyk | |
| 5,185,058 | A | 2/1993 | Cathey, Jr. | |
| 5,185,296 | A | 2/1993 | Morita et al. | |
| 5,196,134 | A | 3/1993 | Jackson | |
| 5,197,800 | A | 3/1993 | Saidman et al. | 366/136 |
| 5,201,960 | A | 4/1993 | Starov | |
| 5,213,619 | A | 5/1993 | Jackson et al. | |
| 5,215,592 | A | 6/1993 | Jackson | |
| 5,225,173 | A | 7/1993 | Wai | |
| 5,236,602 | A | 8/1993 | Jackson | |
| 5,237,824 | A | 8/1993 | Pawliszyn | |
| 5,238,671 | A | 8/1993 | Matson et al. | |
| 5,250,078 | A | 10/1993 | Saus et al. | |
| 5,261,965 | A | 11/1993 | Moslehi | |
| 5,266,205 | A | 11/1993 | Fulton et al. | |
| 5,269,815 | A | 12/1993 | Schlenker et al. | |
| 5,269,850 | A | 12/1993 | Jackson | |
| 5,274,129 | A | 12/1993 | Natale et al. | |
| 5,285,352 | A | 2/1994 | Pastore et al. | |
| 5,285,845 | A | 2/1994 | Ostbo | 165/168 |
| 5,288,333 | A | 2/1994 | Tanaka et al. | |
| 5,290,361 | A | 3/1994 | Hayashida et al. | |
| 5,294,261 | A | 3/1994 | McDermott et al. | |
| 5,298,032 | A | 3/1994 | Schlenker et al. | |
| 5,304,515 | A | 4/1994 | Morita et al. | |
| 5,306,350 | A | 4/1994 | Hoy et al. | |
| 5,312,882 | A | 5/1994 | DeSimone et al. | |
| 5,314,574 | A | 5/1994 | Takahashi | |
| 5,316,591 | A | 5/1994 | Chao et al. | |
| 5,320,742 | A | 6/1994 | Fletcher et al. | |
| 5,328,722 | A | 7/1994 | Ghanayem et al. | |
| 5,334,332 | A | 8/1994 | Lee | |
| 5,334,493 | A | 8/1994 | Fujita et al. | |
| 5,339,539 | A | 8/1994 | Shiraishi et al. | 34/58 |
| 5,352,327 | A | 10/1994 | Witowski | |
| 5,356,538 | A | 10/1994 | Wai et al. | |
| 5,364,497 | A | 11/1994 | Chau et al. | |
| 5,370,740 | A | 12/1994 | Chao et al. | |
| 5,370,741 | A | 12/1994 | Bergman | |
| 5,370,742 | A | 12/1994 | Mitchell et al. | |
| 5,397,220 | A | 3/1995 | Akihisa et al. | 417/369 |
| 5,401,322 | A | 3/1995 | Marshall | |
| 5,403,621 | A | 4/1995 | Jackson et al. | |
| 5,403,665 | A | 4/1995 | Alley et al. | |
| 5,417,768 | A | 5/1995 | Smith, Jr. et al. | |
| 5,456,759 | A | 10/1995 | Stanford, Jr. et al. | |
| 5,470,393 | A | 11/1995 | Fukazawa | |
| 5,474,812 | A | 12/1995 | Truckenmuller et al. | |
| 5,482,564 | A | 1/1996 | Douglas et al. | |
| 5,486,212 | A | 1/1996 | Mitchell et al. | |
| 5,494,526 | A | 2/1996 | Paranjpe | |
| 5,500,081 | A | 3/1996 | Bergman | |
| 5,501,761 | A | 3/1996 | Evans et al. | |
| 5,514,220 | A | 5/1996 | Wetmore et al. | |
| 5,522,938 | A | 6/1996 | O'Brien | |
| 5,547,774 | A | 8/1996 | Gimzewski et al. | |
| 5,550,211 | A | 8/1996 | DeCrosta et al. | |
| 5,580,846 | A | 12/1996 | Hayashida et al. | |
| 5,589,082 | A | 12/1996 | Lin et al. | |
| 5,589,105 | A | 12/1996 | DeSimone et al. | |
| 5,629,918 | A | 5/1997 | Ho et al. | |
| 5,632,847 | A | 5/1997 | Ohno et al. | |
| 5,635,463 | A | 6/1997 | Muraoka | |
| 5,637,151 | A | 6/1997 | Schulz | |
| 5,641,887 | A | 6/1997 | Beckman et al. | |
| 5,656,097 | A | 8/1997 | Olesen et al. | |
| 5,665,527 | A | 9/1997 | Allen et al. | |
| 5,676,705 | A | 10/1997 | Jureller et al. | |
| 5,679,169 | A | 10/1997 | Gonzales et al. | |
| 5,679,171 | A | 10/1997 | Saga et al. | |
| 5,683,473 | A | 11/1997 | Jureller et al. | |
| 5,683,977 | A | 11/1997 | Jureller et al. | |
| 5,688,879 | A | 11/1997 | DeSimone | |
| 5,700,379 | A | 12/1997 | Biebl | |
| 5,714,299 | A | 2/1998 | Combes et al. | |
| 5,725,987 | A | 3/1998 | Combes et al. | |
| 5,726,211 | A | 3/1998 | Hedrick et al. | |
| 5,730,874 | A | 3/1998 | Wai et al. | |
| 5,736,425 | A | 4/1998 | Smith et al. | |
| 5,739,223 | A | 4/1998 | DeSimone | |
| 5,766,367 | A | 6/1998 | Smith et al. | |
| 5,783,082 | A | 7/1998 | DeSimone et al. | |
| 5,797,719 | A | 8/1998 | James et al. | |
| 5,798,438 | A | 8/1998 | Sawan et al. | |
| 5,804,607 | A | 9/1998 | Hedrick et al. | |
| 5,807,607 | A | 9/1998 | Smith et al. | |
| 5,847,443 | A | 12/1998 | Cho et al. | |
| 5,866,005 | A | 2/1999 | DeSimone et al. | |
| 5,868,856 | A | 2/1999 | Douglas et al. | |
| 5,868,862 | A | 2/1999 | Douglas et al. | |
| 5,872,061 | A | 2/1999 | Lee et al. | |
| 5,872,257 | A | 2/1999 | Beckman et al. | |
| 5,873,948 | A | 2/1999 | Kim | |
| 5,881,577 | A | 3/1999 | Sauer et al. | |
| 5,882,182 | A | 3/1999 | Kato et al. | 417/366 |
| 5,888,050 | A | 3/1999 | Fitzgerald et al. | |
| 5,890,501 | A | 4/1999 | Kaneko et al. | 134/1.3 |
| 5,893,756 | A | 4/1999 | Berman et al. | |
| 5,896,870 | A | 4/1999 | Huynh et al. | |
| 5,900,354 | A | 5/1999 | Batchelder | |
| 5,904,737 | A | 5/1999 | Preston et al. | |
| 5,908,510 | A | 6/1999 | McCullough et al. | |
| 5,928,389 | A | 7/1999 | Jevtic | |
| 5,932,100 | A | 8/1999 | Yager et al. | |
| 5,944,996 | A | 8/1999 | DeSimone et al. | |
| 5,954,101 | A | 9/1999 | Drube et al. | |
| 5,955,140 | A | 9/1999 | Smith et al. | |
| 5,965,025 | A | 10/1999 | Wai et al. | |
| 5,976,264 | A | 11/1999 | McCullough et al. | |
| 5,980,648 | A | 11/1999 | Adler | |
| 5,992,680 | A | 11/1999 | Smith | |
| 5,994,696 | A | 11/1999 | Tai et al. | |
| 6,005,226 | A | 12/1999 | Aschner et al. | |
| 6,010,315 | A | 1/2000 | Kishimoto et al. | 417/228 |
| 6,017,820 | A | 1/2000 | Ting et al. | |
| 6,021,791 | A | 2/2000 | Dryer et al. | |
| 6,024,801 | A | 2/2000 | Wallace et al. | |
| 6,037,277 | A | 3/2000 | Masakara et al. | |
| 6,063,714 | A | 5/2000 | Smith et al. | |
| 6,067,728 | A | 5/2000 | Farmer et al. | |
| 6,085,762 | A | 7/2000 | Barton | 134/25.4 |
| 6,099,619 | A | 8/2000 | Lansbarkis et al. | |
| 6,100,198 | A | 8/2000 | Grieger et al. | |
| 6,110,232 | A | 8/2000 | Chen et al. | |
| 6,114,044 | A | 9/2000 | Houston et al. | |
| 6,128,830 | A | 10/2000 | Bettcher et al. | |
| 6,140,252 | A | 10/2000 | Cho et al. | |
| 6,149,828 | A | 11/2000 | Vaartstra | |
| 6,171,645 | B1 | 1/2001 | Smith et al. | |
| 6,200,943 | B1 | 3/2001 | Romack et al. | |
| 6,216,364 | B1 | 4/2001 | Tanaka et al. | |
| 6,224,774 | B1 | 5/2001 | DeSimone et al. | |

| | | | |
|---|---|---|---|
| 6,228,563 | B1 | 5/2001 | Starov et al. |
| 6,228,826 | B1 | 5/2001 | DeYoung et al. |
| 6,232,238 | B1 | 5/2001 | Chang et al. |
| 6,232,417 | B1 | 5/2001 | Rhodes et al. |
| 6,235,145 | B1 | 5/2001 | Li et al. ...................... 156/345 |
| 6,239,038 | B1 | 5/2001 | Wen |
| 6,242,165 | B1 | 6/2001 | Vaartstra |
| 6,251,250 | B1 | 6/2001 | Keigler |
| 6,255,732 | B1 | 7/2001 | Yokoyama et al. |
| 6,262,510 | B1 | 7/2001 | Lungu ........................ 310/254 |
| 6,264,003 | B1 | 7/2001 | Dong et al. .............. 184/104.1 |
| 6,270,531 | B1 | 8/2001 | DeYoung et al. |
| 6,270,948 | B1 | 8/2001 | Sato et al. |
| 6,277,753 | B1 | 8/2001 | Mullee et al. |
| 6,284,558 | B1 | 9/2001 | Sakamoto |
| 6,286,231 | B1 | 9/2001 | Bergman et al. |
| 6,306,564 | B1 | 10/2001 | Mullee |
| 6,319,858 | B1 | 11/2001 | Lee et al. |
| 6,331,487 | B2 | 12/2001 | Koch |
| 6,333,268 | B1 | 12/2001 | Starov et al. |
| 6,344,243 | B1 | 2/2002 | McClain et al. |
| 6,358,673 | B1 | 3/2002 | Namatsu |
| 6,361,696 | B1 * | 3/2002 | Spiegelman et al. ........ 210/662 |
| 6,365,529 | B1 | 4/2002 | Hussein et al. .............. 438/780 |
| 6,367,491 | B1 | 4/2002 | Marshall et al. |
| 6,380,105 | B1 | 4/2002 | Smith et al. |
| 6,425,956 | B1 | 7/2002 | Cotte et al. |
| 6,431,185 | B1 | 8/2002 | Tomita et al. ................ 134/1.3 |
| 6,436,824 | B1 | 8/2002 | Chooi et al. |
| 6,454,945 | B1 | 9/2002 | Weigl et al. |
| 6,458,494 | B2 | 10/2002 | Song et al. |
| 6,461,967 | B2 | 10/2002 | Wu et al. |
| 6,465,403 | B1 | 10/2002 | Skee |
| 6,485,895 | B1 | 11/2002 | Choi et al. |
| 6,486,078 | B1 | 11/2002 | Rangarajan et al. |
| 6,492,090 | B2 | 12/2002 | Nishi et al. |
| 6,500,605 | B1 | 12/2002 | Mullee et al. |
| 6,509,141 | B2 | 1/2003 | Mullee |
| 6,536,450 | B1 | 3/2003 | Dolechek .................... 134/108 |
| 6,537,916 | B2 | 3/2003 | Mullee et al. |
| 6,558,475 | B1 | 5/2003 | Jur et al. |
| 6,561,220 | B2 | 5/2003 | McCullough et al. .. 137/565.12 |
| 6,562,146 | B1 | 5/2003 | DeYoung et al. |
| 6,596,093 | B2 | 7/2003 | DeYoung et al. |
| 6,635,565 | B2 | 10/2003 | Wu et al. |
| 6,641,678 | B2 | 11/2003 | DeYoung et al. |
| 6,669,785 | B2 | 12/2003 | DeYoung et al. ............... 134/3 |
| 6,712,081 | B1 | 3/2004 | Uehara et al. ............... 134/105 |
| 6,764,552 | B1 | 7/2004 | Joyce et al. |
| 6,766,810 | B1 | 7/2004 | Van Cleemput .............. 134/1.3 |
| 6,800,142 | B1 | 10/2004 | Tipton et al. .................. 134/26 |
| 6,848,458 | B1 | 2/2005 | Shrinivasan et al. ......... 134/108 |
| 6,890,853 | B2 | 5/2005 | Biberger et al. |
| 6,905,555 | B2 | 6/2005 | DeYoung et al. .............. 134/30 |
| 7,014,143 | B2 | 3/2006 | Pham et al. ................. 134/105 |
| 2001/0019857 | A1 | 9/2001 | Yokoyama et al. |
| 2001/0024247 | A1 | 9/2001 | Nakata |
| 2001/0041455 | A1 | 11/2001 | Yun et al. |
| 2001/0041458 | A1 | 11/2001 | Ikakura et al. |
| 2002/0001929 | A1 | 1/2002 | Biberger et al. |
| 2002/0014257 | A1 | 2/2002 | Chandra et al. ............... 134/19 |
| 2002/0046707 | A1 | 4/2002 | Biberger et al. ............. 118/733 |
| 2002/0055323 | A1 | 5/2002 | McClain et al. |
| 2002/0074289 | A1 | 6/2002 | Sateria et al. |
| 2002/0081533 | A1 | 6/2002 | Simons et al. |
| 2002/0088477 | A1 | 7/2002 | Cotte et al. |
| 2002/0098680 | A1 | 7/2002 | Goldstein et al. |
| 2002/0106867 | A1 | 8/2002 | Yang et al. |
| 2002/0112740 | A1 | 8/2002 | DeYoung et al. |
| 2002/0112746 | A1 | 8/2002 | DeYoung et al. |
| 2002/0115022 | A1 | 8/2002 | Messick et al. |
| 2002/0117391 | A1 | 8/2002 | Beam |
| 2002/0123229 | A1 | 9/2002 | Ono et al. |
| 2002/0127844 | A1 | 9/2002 | Grill et al. |
| 2002/0132192 | A1 | 9/2002 | Namatsu |
| 2002/0141925 | A1 | 10/2002 | Wong et al. |
| 2002/0142595 | A1 | 10/2002 | Chiou |
| 2002/0144713 | A1 | 10/2002 | Kuo et al. ..................... 134/18 |
| 2002/0150522 | A1 | 10/2002 | Heim et al. |
| 2002/0164873 | A1 | 11/2002 | Masuda et al. |
| 2003/0003762 | A1 | 1/2003 | Cotte et al. |
| 2003/0008155 | A1 | 1/2003 | Hayashi et al. ............. 428/447 |
| 2003/0008238 | A1 | 1/2003 | Goldfarb et al. |
| 2003/0008518 | A1 | 1/2003 | Chang et al. |
| 2003/0013311 | A1 | 1/2003 | Chang et al. |
| 2003/0029479 | A1 | 2/2003 | Asano ......................... 134/18 |
| 2003/0036023 | A1 | 2/2003 | Moreau et al. .............. 430/324 |
| 2003/0047533 | A1 | 3/2003 | Reid et al. |
| 2003/0051741 | A1 | 3/2003 | DeSimone et al. |
| 2003/0081206 | A1 | 5/2003 | Doyle ......................... 356/301 |
| 2003/0106573 | A1 | 6/2003 | Masuda et al. |
| 2003/0125225 | A1 | 7/2003 | Xu et al. |
| 2003/0198895 | A1 | 10/2003 | Toma et al. ................. 430/314 |
| 2003/0205510 | A1 | 11/2003 | Jackson |
| 2003/0217764 | A1 | 11/2003 | Masuda et al. |
| 2004/0011386 | A1 | 1/2004 | Seghal ......................... 134/26 |
| 2004/0018452 | A1 | 1/2004 | Schilling .................... 430/314 |
| 2004/0020518 | A1 | 2/2004 | DeYoung et al. |
| 2004/0045588 | A1 | 3/2004 | DeYoung et al. .............. 134/26 |
| 2004/0087457 | A1 | 5/2004 | Korzenski et al. |
| 2004/0099604 | A1 | 5/2004 | Hauck et al. ................ 210/656 |
| 2004/0099952 | A1 | 5/2004 | Goodner et al. ............. 257/758 |
| 2004/0103922 | A1 | 6/2004 | Inoue et al. |
| 2004/0112409 | A1 | 6/2004 | Schilling |
| 2004/0118281 | A1 | 6/2004 | Leitch et al. .................. 95/236 |
| 2004/0118812 | A1 | 6/2004 | Watkins et al. ................ 216/83 |
| 2004/0121269 | A1 | 6/2004 | Liu et al. .................... 430/329 |
| 2004/0134515 | A1 | 7/2004 | Castrucci |
| 2004/0157415 | A1 | 8/2004 | Goodner ..................... 438/496 |
| 2004/0168709 | A1 | 9/2004 | Drumm et al. ................ 134/18 |
| 2004/0175958 | A1 | 9/2004 | Lin et al. .................... 438/778 |
| 2004/0177867 | A1 | 9/2004 | Schilling |
| 2004/0211440 | A1 | 10/2004 | Wang et al. .................... 134/2 |
| 2004/0221875 | A1 | 11/2004 | Saga et al. ..................... 134/26 |
| 2004/0255978 | A1 | 12/2004 | Fury et al. ..................... 134/18 |
| 2004/0255979 | A1 | 12/2004 | Fury et al. ..................... 134/21 |
| 2004/0259357 | A1 | 12/2004 | Saga |
| 2005/0116345 | A1 | 6/2005 | Murtuza ..................... 257/758 |
| 2005/0118813 | A1 | 6/2005 | Korzenski et al. ........... 438/689 |
| 2005/0191865 | A1 | 9/2005 | Jacobson et al. ............ 438/780 |
| 2005/0205515 | A1 | 9/2005 | Saga et al. ...................... 216/2 |
| 2005/0241672 | A1 | 11/2005 | Matz et al. ................... 134/1.2 |
| 2006/0003592 | A1 | 1/2006 | Gale et al. .................. 438/745 |
| 2006/0102204 | A1 | 5/2006 | Jacobson et al. .............. 134/26 |
| 2006/0102208 | A1 | 5/2006 | Jacobson et al. .............. 134/56 |
| 2006/0177362 | A1 | 8/2006 | D'Evelyn et al. ........ 422/245.1 |
| 2006/0180175 | A1 | 8/2006 | Parent ........................ 134/1.3 |

FOREIGN PATENT DOCUMENTS

| | | | |
|---|---|---|---|
| DE | 40 04 111 | C2 | 8/1990 |
| DE | 39 06 724 | C2 | 9/1990 |
| DE | 39 06 735 | C2 | 9/1990 |
| DE | 39 06 737 | A1 | 9/1990 |
| DE | 44 29 470 | A1 | 3/1995 |
| DE | 43 44 021 | A1 | 6/1995 |
| EP | 0 283 740 | A2 | 9/1988 |
| EP | 0 302 345 | A2 | 2/1989 |
| EP | 0 370 233 | A1 | 5/1990 |
| EP | 0 391 035 | A2 | 10/1990 |
| EP | 0408216 | A2 | 1/1991 |
| EP | 0 518 653 | B1 | 12/1992 |
| EP | 0 536 752 | A2 | 4/1993 |
| EP | 0 572 913 | A1 | 12/1993 |
| EP | 0 620 270 | A3 | 10/1994 |
| EP | 0 641 611 | A1 | 8/1995 |

| | | | |
|---|---|---|---|
| EP | 0 679 753 | B1 | 11/1995 |
| EP | 0 711 864 | B1 | 5/1996 |
| EP | 0 726 099 | A2 | 8/1996 |
| EP | 0 727 711 | A2 | 8/1996 |
| EP | 0 822 583 | A2 | 2/1998 |
| EP | 0 829 312 | A2 | 3/1998 |
| EP | 0 836 895 | A2 | 4/1998 |
| EP | 0822583 | A2 | 4/1998 |
| JP | 2-304941 | | 12/1980 |
| JP | 60-192333 | | 9/1985 |
| JP | 1-045131 | | 2/1989 |
| JP | 1-246835 | | 10/1989 |
| JP | 2-209729 | | 8/1990 |
| JP | 4-14222 | | 1/1992 |
| JP | 6-260473 | | 9/1994 |
| JP | 7-142333 | | 6/1995 |
| JP | 7-142441 | | 6/1995 |
| JP | 7-171527 | | 7/1995 |
| JP | 7-310192 | | 11/1995 |
| JP | 8-186140 | | 7/1996 |
| JP | 8-222508 | | 8/1996 |
| JP | 9-213688 | | 8/1997 |
| JP | 10-135170 | | 5/1998 |
| JP | 2000-114218 | | 4/2000 |
| JP | 2001-77074 | | 3/2001 |
| JP | 2004-317641 | | 11/2004 |
| WO | WO 90/06189 | | 6/1990 |
| WO | WO 90/13675 | | 11/1990 |
| WO | WO 93/14255 | | 7/1993 |
| WO | WO 93/14259 | | 7/1993 |
| WO | WO 93/20116 | | 10/1993 |
| WO | WO 96/27704 | | 9/1996 |
| WO | WO 99/49998 | | 10/1999 |
| WO | WO 00/73241 | A1 | 12/2000 |
| WO | WO 01/33613 | A2 | 5/2001 |
| WO | WO 01/87505 | A1 | 11/2001 |
| WO | WO 02/09894 | A2 | 2/2002 |
| WO | WO 02/11191 | A2 | 2/2002 |
| WO | WO 02/15251 | A1 | 2/2002 |
| WO | WO 02/16051 | A2 | 2/2002 |

OTHER PUBLICATIONS

"Los Almos National Laboratory," Solid State Technology, pp. S10 & S14, Oct. 1998.

"Supercritical Carbon Dioxide Resist Remover, SCORR, the Path to Least Photoresistance," Los Alamos National Laboratory, 1998.

Guan, Z. et al., "Fluorocarbon-Based Heterophase Polymeric Materials. 1. Block Copolymer Surfactants for Carbon Dioxide Applications," Macromolecules, vol. 27, 1994, pp. 5527-5532.

International Journal of Environmentally Conscious Design & Manufacturing, vol. 2, No. 1, 1993, p. 83.

Matson and Smith "Supercritical Fluids", Journal of the American Ceramic Society, vol. 72, No. 6, pp. 872-874, Jun. 1989.

Ziger, D.H. et al., "Compressed Fluid Technology: Application to RIE Developed Resists," AIChE Journal, vol. 33, No. 10, Oct. 1987, pp. 1585-1591.

Kirk-Othmer, "Alcohol Fuels to Toxicology," Encyclopedia of Chemical Terminology, 3rd ed., Supplement Volume, New York: John Wiley & Sons, 1984, pp. 872-893.

"Cleaning with Supercritical $CO_2$," NASA Tech Briefs, MFS-29611, Marshall Space Flight Center, Alabama, Mar. 1979.

Basta, N., "Supercritical Fluids: Still Seeking Acceptance," Chemical Engineering, vol. 92, No. 3, Feb. 24, 1985, p. 14.

Takahashi, D., "Los Alamos Lab Finds Way to Cut Chip Toxic Waste," Wall Street Journal, Jun. 22, 1998.

"Supercritical CO2 Process Offers Less Mess from Semiconductor Plants", Chemical Engineering Magazine, pp. 27 & 29, Jul. 1998.

Sun, Y.P. et al., "Preparation of Polymer-Protected Semiconductor Nanoparticles Through the Rapid Expansion of Supercritical Fluid Solution," Chemical Physics Letters, pp. 585-588, May 22, 1998.

Jackson, K et al., "Surfactants and Microemulsions in Supercritical Fluids," Supercritical Fluid Cleaning. Noyes Publications, Westwood, NJ, pp. 87-120, Spring 1998.

Kryszewski, M., "Production of Metal and Semiconductor Nanoparticles on Polymer Systems," Polimery, pp. 65-73, Feb. 1998.

Bakker, G.L. et al., "Surface Cleaning and Carbonaceous Film Removal Using High Pressure, High Temperature Water, and Water/C02 Mixtures," J. Electrochem. Soc, vol. 145, No. 1, pp. 284-291, Jan. 98.

Ober, C.K. et al., "Imaging Polymers with Supercritical Carbon Dioxide," Advanced Materials, vol. 9, No. 13, 1039-1043, Nov. 3, 1997.

Russick, E.M. et al., "Supercritical Carbon Dioxide Extraction of Solvent from Micro-machined Structures." Supercritical Fluids Extraction and Pollution Prevention, ACS Symposium Series, vol. 670, pp. 255-269, Oct. 21, 1997.

Dahmen, N. et al., "Supercritical Fluid Extraction of Grinding and Metal Cutting Waste Contaminated with Oils," Supercritical Fluids—Extraction and Pollution Prevention, ACS Symposium Series, vol. 670, pp. 270-279, Oct. 21, 1997.

Wai, C.M., "Supercritical Fluid Extraction: Metals as Complexes," Journal of Chromatography A, vol. 785, pp. 369-383, Oct. 17, 1997.

Xu, C. et al., "Submicron-Sized Spherical Yttrium Oxide Based Phosphors Prepared by Supercritical CO2-Assisted aerosolization and pyrolysis," Appl. Phys. Lett., vol. 71, No. 12, Sep. 22, 1997, pp. 1643-1645.

Tomioka Y, et al., "Decomposition of Tetramethylammonium (TMA) in a Positive Photo-resist Developer by Supercritical Water," Abstracts of Papers $214^{th}$ ACS Natl Meeting, American Chemical Society, Abstract No. 108, Sep. 7, 1997.

Klein, H. et al., "Cyclic Organic Carbonates Serve as Solvents and Reactive Diluents," Coatings World, pp. 38-40, May 1997.

Bühler, J. et al., Linear Array of Complementary Metal Oxide Semiconductor Double-Pass Metal Micro-mirrors, Opt. Eng., Vol. 36, No. 5, pp. 1391-1398, May 1997.

Jo, M.H. et al., Evaluation of SIO2 Aerogel Thin Film with Ultra Low Dielectric Constant as an Intermetal Dielectric, Microelectronic Engineering, vol. 33, pp. 343-348, Jan.1, 997.

McClain, J.B. et al., "Design of Nonionic Surfactants for Supercritical Carbon Dioxide," Science, vol. 274, Dec. 20, 1996. pp. 2049-2052.

Znaidi, L. et al., "Batch and Semi-Continuous Synthesis of Magnesium Oxide Powders from Hydrolysis and Supercritical Treatment of Mg(OCH3)2," Materials Research Bulletin, vol. 31, No. 12, pp. 1527-1335, Dec. 1996.

Tadros, M.E., "Synthesis of Titanium Dioxide Particles in Supercritical CO2," J. Supercritical Fluids, vol. 9, pp. 172-176, Sep. 1996.

Courtecuisse, V.G. et al., "Kinetics of the Titanium Isopropoxide Decomposition in Supercritical Isopropyl Alcohol," Ind. Eng. Chem. Res., vol. 35, No. 8, pp. 2539-2545, Aug. 1996.

Gabor, A, et al., "Block and Random Copolymer resists Designed for 193 nm Lithography and Environmentally Friendly Supercritical CO2 Development," SPIE, vol . 2724, pp. 410-417, Jun. 1996.

Schimek, G. L. et al., "Supercritical Ammonia Synthesis and Characterization for Four New Alkali Metal Silver Antimony Sulfides . . .," J. Solid State Chemistry, vol. 123 pp. 277-284, May 1996.

Gallagher-Wetmore, P. et al., "Supercritical Fluid Processing: Opportunities for New Resist Materials and Processes," SPIE, vol. 2725, pp. 289-299, Apr. 1996.

Papathomas, K.I. et al., "Debonding of Photoresists by Organic Solvents," J. Applied Polymer Science, vol. 59, pp. 2029-2037, Mar. 28, 1996.

Watkins, J.J. et al., "Polymer/metal Nanocomposite Synthesis in Supercritical CO2," Chemistry of Materials, vol. 7, No. 11, Nov. 1995., pp. 1991-1994.

Gloyna, E.F. et al., "Supercritical Water Oxidation Research and Development Update," Environmental Progress, vol. 14, No. 3. pp. 182-192, Aug. 1995.

Gallagher-Wetmore, P. et al., "Supercritical Fluid Processing: A New Dry Technique for Photoresist Developing," SPIE vol. 2438, pp. 694-708, Jun. 1995.

Gabor, A.H. et al., "Silicon-Containing Block Copolymer Resist Materials," Microelectronics Technology - Polymers for Advanced Imaging and Packaging, ACS Symposium Series, vol, 614, pp. 281-298, Apr. 1995.

Tsiartas, P.C. et al., "Effect of Molecular weight Distribution on the Dissolution Properties of Novolac Blends," SPIE, vol. 2438, pp. 264-271, Jun. 1995.

Allen, R.D et al., "Performance Properties of Near-monodisperse Novolak Resins," SPIE, vol. 2438, pp. 250-260, Jun. 1995.

Wood, P.T. et al., "Synthesis of New Channeled Structures in Supercritical Amines. . . ," Inorg. Chem., vol. 33, pp. 1556-1558, 1994.

Jerome, J.E. et al., "Synthesis of New Low-Dimensional Quaternary Compounds . . . ," Inorg. Chem, vol. 33, pp. 1733-1734, 1994.

McHardy, J. et al., "Progress in Supercritical CO2 Cleaning," SAMPE Jour., vol. 29, No. 5, pp. 20-27, Sep. 1993.

Purtell, R, et al., "Precision Parts Cleaning using Supercritical Fluids," J. Vac, Sci, Technol. A. vol. 11, No. 4, Jul. 1993, pp. 1696-1701.

Bok, E, et al., "Supercritical Fluids for Single Wafer Cleaning," Solid State Technology, pp. 117-120, Jun. 1992.

Adschiri, T. et al., "Rapid and Continuous Hydrothermal Crystallization of Metal Oxide Particles in Supercritical Water," J. Am. Ceram, Soc., vol. 75, No. 4, pp. 1019-1022, 1992.

Hansen, B.N. et al., "Supercritical Fluid Transport - Chemical Deposition of Films," Chem. Mater., vol. 4, No. 4, pp. 749-752, 1992.

Page, S.H. et al., "Predictability and Effect of Phase Behavior of CO2/ Propylene Carbonate in Supercritical Fluid Chromatography," J. Microcol, vol. 3, No. 4, pp. 355-369, 1991.

Brokamp, T. et al., "Synthese und Kristallstruktur Eines Gemischtvalenten Lithium-Tantalnitrids Li2Ta3N5," J. Alloys and Compounds, vol. 176. pp. 47-60, 1991.

Hybertson, B.M. et al., "Deposition of Palladium Films by a Novel Supercritical Fluid Transport Chemical Deposition Process," Mat. Res. Bull., vol. 26, pp. 1127-1133, 1991.

Ziger, D. H. et al., "Compressed Fluid Technology: Application to RIE-Developed Resists," AiChE Jour., vol. 33, No. 10, pp. 1585-1591, Oct. 1987.

Matson, D.W. et al., "Rapid Expansion of Supercritical Fluid Solutions: Solute Formation of Powders, Thin Films, and Fibers," Ind. Eng. Chem. Res., vol. 26, No. 11, pp. 2298-2306, 1987.

Tolley, W.K. et al., "Stripping Organics from Metal and Mineral Surfaces using Supercritical Fluids," Separation Science and Technology, vol. 22, pp. 1087-1101, 1987.

"Final Report on the Safety Assessment of Propylene Carbonate", J. American College of Toxicology, vol. 6, No. 1, pp. 23-51, 1987.

"Porous Xerogel Films as Ultra-Low Permittivity Dielectrics for ULSI Interconnect Applications", Materials Research Society, pp. 463-469, 1997.

Kawakami et al, "A Super Low-k (k=1.1) Silica Aerogel Film Using Supercritical Drying Technique", IEEE, pp. 143-145, 2000.

R.F. Reidy, "Effects of Supercritical Processing on Ultra Low-K Films", Texas Advanced Technology Program, Texas Instruments, and the Texas Academy of Mathematics and Science.

Anthony Muscat, "Backend Processing Using Supercritical CO2", University of Arizona.

D. Goldfarb et al., "Aqueous-based Photoresist Drying Using Supercritical Carbon Dioxide to Prevent Pattern Collapse", J. Vacuum Sci. Tech. B 18 (6), 3313 (2000).

H. Namatsu et al., "Supercritical Drying for Water-Rinsed Resist Systems", J. Vacuum Sci. Tech. B 18 (6), 3308 (2000).

N. Sundararajan et al., "Supercritical CO2 Processing for Submicron Imaging of Fluoropolymers", Chem. Mater. 12, 41 (2000).

US 6,001,133, 12/1999, DeYoung et al. (withdrawn)

US 6,486,282, 11/2002, Dammel et al. (withdrawn)

* cited by examiner

100

REMOVAL OF CONTAMINANTS FROM A FLUID

CROSS-REFERENCE TO RELATED APPLICATIONS

This patent application is related to commonly owned U.S. Pat. No. 6,500,605, entitled "REMOVAL OF PHOTORESIST AND RESIDUE FROM SUBSTRATE USING SUPERCRITICAL CARBON DIOXIDE PROCESS", issued Dec. 31, 2002, U.S. Pat. No. 6,277,753, entitled "REMOVAL OF CMP RESIDUE FROM SEMICONDUCTORS USING SUPERCRITICAL CARBON DIOXIDE PROCESS", issued Aug. 21, 2001, as well as co-owned and co-pending U.S. patent applications Ser. No. 09/912,844, now U.S. Pat. No. 6,921,456 entitled "HIGH PRESSURE PROCESSING CHAMBER FOR SEMICONDUCTOR SUBSTRATE," filed Jul. 24, 2001, Ser. No. 09/970,309, now abandoned, entitled "HIGH PRESSURE PROCESSING CHAMBER FOR MULTIPLE SEMICONDUCTOR SUBSTRATES," filed Oct. 3, 2001, Ser. No. 10/121,791, now abandoned, entitled "HIGH PRESSURE PROCESSING CHAMBER FOR SEMICONDUCTOR SUBSTRATE INCLUDING FLOW ENHANCING FEATURES," filed Apr. 10, 2002, and Ser. No. 10/364,284, now U.S. Pat. No. 7,077,917, entitled "HIGH-PRESSURE PROCESSING CHAMBER FOR A SEMICONDUCTOR WAFER," filed Feb. 10, 2003, Ser. No. 10/442,557, now abandoned, entitled "TETRA-ORGANIC AMMONIUM FLUORIDE AND HF IN SUPERCRITICAL FLUID FOR PHOTORESIST AND RESIDUE REMOVAL", filed May 10, 1003, and Ser. No. 10/321,341, now abandoned, entitled "FLUORIDE IN SUPERCRITICAL FLUID FOR PHOTORESIST AND RESIDUE REMOVAL," filed Dec. 16, 1002, all of which are incorporated herein by reference in their entirety.

FIELD OF THE INVENTION

The present invention relates to the field of removing contaminants from a fluid. More particularly, the present invention relates to the field of removing contaminants from carbon dioxide ($CO_2$) to produce purified $CO_2$ to reduce the contaminant level in supercritical $CO_2$ processing.

BACKGROUND OF THE INVENTION

A fluid in the supercritical state is referred to as a supercritical fluid. A fluid enters the supercritical state when it is subjected to a combination of pressure and temperature at which the density of the fluid approaches that of a liquid. Supercritical fluids exhibit properties of both a liquid and a gas. For example, supercritical fluids are characterized by high solvating and solubilizing properties that are typically associated with compositions in the liquid state. Supercritical fluids also have a low viscosity that is characteristic of compositions in the gaseous state. Supercritical fluids have been adopted into common practices in various fields. The types of applications include pharmaceutical applications, cleaning and drying of various materials, food chemical extractions, and chromatography.

Supercritical fluids have been used to remove residue from surfaces or extract contaminants from various materials. For example, as described in U.S. Pat. No. 6,367,491 to Marshall, et al., entitled "Apparatus for Contaminant Removal Using Natural Convection Flow and Changes in Solubility Concentration by Temperature," issued Apr. 9, 2002, supercritical and near-supercritical fluids have been used as solvents to clean contaminants from articles; citing, NASA Tech Brief MFS-29611 (December 1990), describing the use of supercritical carbon dioxide as an alternative for hydrocarbon solvents conventionally used for washing organic and inorganic contaminants from the surfaces of metal parts.

Supercritical fluids have been employed in the cleaning of semiconductor wafers. For example, an approach to using supercritical carbon dioxide to remove exposed organic photoresist film is disclosed in U.S. Pat. No. 4,944,837 to Nishikawa, et al., entitled "Method of Processing an Article in a Supercritical Atmosphere," issued Jul. 31, 1990. Particulate surface contamination is a serious problem that affects yield in the semiconductor industry. When cleaning wafers, it is important that particles and other contaminants such as photoresist, photoresist residue, and residual etching reactants and byproducts be minimized.

While "high grades" of $CO_2$ are available commercially, calculations show that given the purity levels of delivered $CO_2$ it is all but impossible to avoid particle formation on a substrate during supercritical carbon dioxide processing.

There is a need for removing contaminants and particles from a fluid such as carbon dioxide.

SUMMARY OF THE INVENTION

A first embodiment of the present invention is for a method of removing contaminants from a fluid. The fluid is introduced into a decontamination chamber such that the fluid is cooled and contaminants fall out within the chamber, producing a purified fluid. The purified fluid is then retrieved.

A second embodiment of the present invention is for a method of removing contaminants from a fluid stream of $CO_2$. The fluid stream is introduced to a first filter to reduce a contaminant level of the fluid stream, producing a first filtered $CO_2$ stream. The first filtered $CO_2$ stream is introduced into a decontamination chamber such that the fluid stream is cooled and contaminants fall out within the decontamination chamber, producing a purified $CO_2$.

A third embodiment of the invention is for an apparatus for removing contaminants from a fluid stream including: a decontamination chamber; means for introducing the fluid stream into the decontamination chamber such that the fluid stream is cooled in the decontamination chamber to form a purified fluid stream; and means for removing the purified fluid stream from the decontamination chamber.

A fourth embodiment is an assembly for cleaning a surface of an object that includes: a fluid source, a decontamination chamber; means for introducing a fluid stream into the decontamination chamber such that the fluid stream is sufficiently cooled in the decontamination chamber to form a purified fluid stream; a pressure chamber including an object support; means for directing the purified fluid stream from the decontamination chamber to the pressure chamber; means for pressurizing the pressure chamber; means for performing a cleaning process with a cleaning fluid; and means for depressurizing the pressure chamber.

BRIEF DESCRIPTION OF THE DRAWINGS

A more complete appreciation of various embodiments of the invention and many of the attendant advantages thereof will become readily apparent with reference to the following detailed description, particularly when considered in conjunction with the accompanying drawings, in which.

DETAILED DESCRIPTION OF SEVERAL EMBODIMENTS

Figure 1:
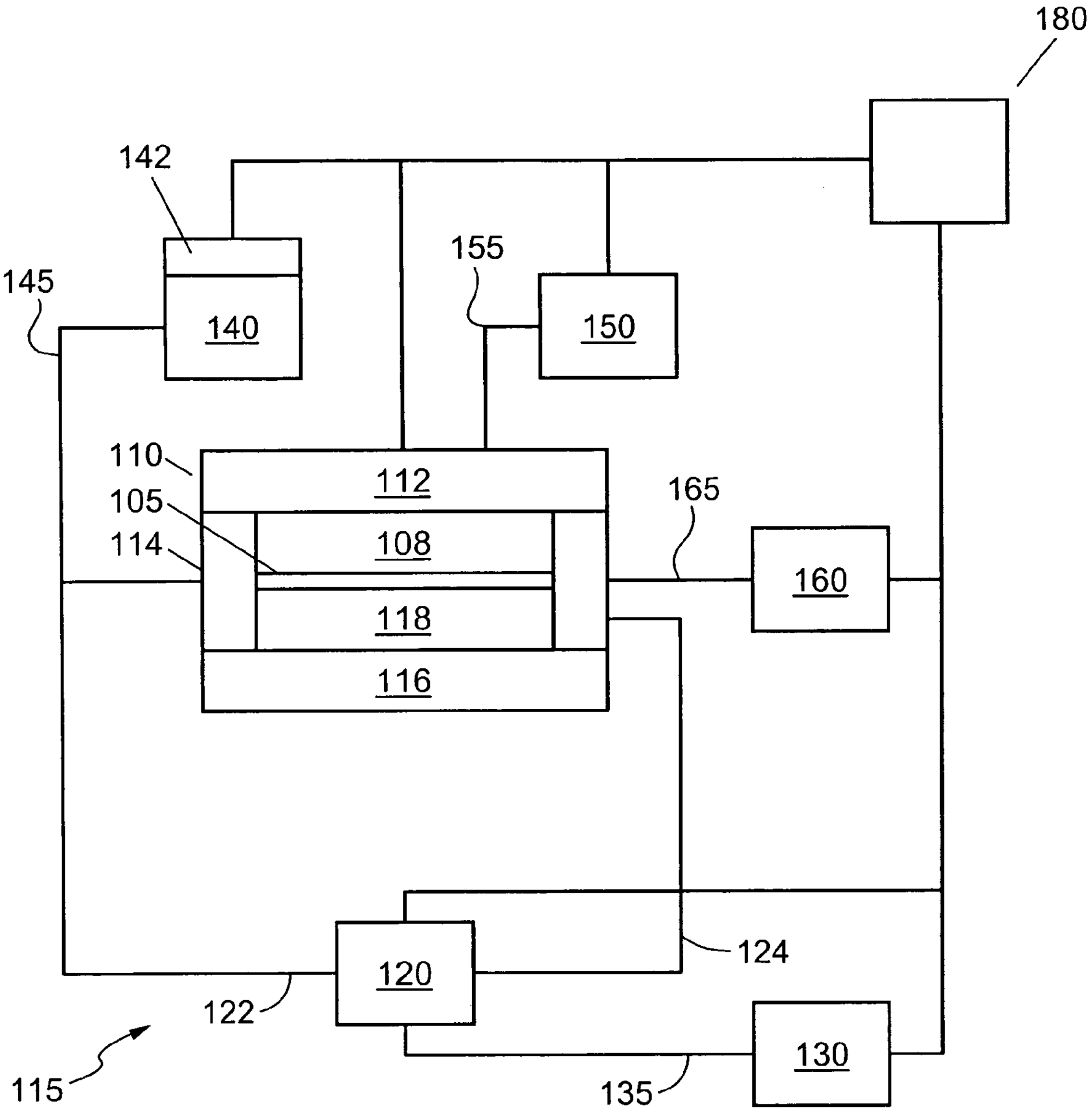
FIG. 1 shows an exemplary block diagram of a processing system in accordance with an embodiment of the invention.

Semiconductor wafers that were cleaned using supercritical processing with commercially available $CO_2$ revealed hydrocarbons and organic residues on the wafers. Hydrocarbons are commonly found as pump oils, lubricants and machining oils. It is known that thread sealant and lubricant on valves can be contributors to supercritical processing contamination. One approach to reducing the level of contamination in supercritical $CO_2$ processing is to employ a system that addresses a more crucial and difficult problem, which is that the most probable source of supercritical $CO_2$ processing contamination is the delivered $CO_2$ itself. The present invention is directed to a method of removing contaminants from a fluid stream, such as a fluid stream of carbon dioxide.

For purposes of the invention, "carbon dioxide" should be understood to refer to carbon dioxide ($CO_2$) employed as a fluid in a liquid, gaseous or supercritical (including near-supercritical) state. "Liquid carbon dioxide" refers to $CO_2$ at vapor-liquid equilibrium conditions. If gaseous $CO_2$ is used, the temperature employed is preferably below 31.1° C. "Supercritical carbon dioxide" refers herein to $CO_2$ at conditions above the critical temperature (31.1° C.) and critical pressure (1070.4 psi). When $CO_2$ is subjected to temperatures and pressures above 31.1° C. and 1070.4 psi, respectively, it is determined to be in the supercritical state. "Near-supercritical carbon dioxide" refers to $CO_2$ within about 85% of absolute critical temperature and critical pressure.

A first embodiment of the present invention is a method of removing contaminants from a fluid comprising introducing the fluid into a decontamination chamber such that the fluid is cooled and contaminants fall out within a chamber in the decontamination system, producing a purified fluid. For the purposes of the invention, the term "contaminants" includes high molecular weight compounds such as hydrocarbons; organic molecules or polymers; and particulate matter such as acrylic esters, polyethers, organic acid salts, polyester fiber, or cellulose.

In another embodiment, the fluid comprises liquid, supercritical, or near-supercritical carbon dioxide. Alternatively, the fluid comprises liquid, supercritical, or near-supercritical $CO_2$ in conjunction with solvents, co-solvents, surfactants and/or other ingredients. Examples of solvents, co-solvents, and surfactants are disclosed in co-owned U.S. Pat. No. 6,500,605, entitled "REMOVAL OF PHOTORESIST AND RESIDUE FROM SUBSTRATE USING SUPERCRITICAL CARBON DIOXIDE PROCESS", issued Dec. 31, 2002, and U.S. Pat. No. 6,277,753, entitled "REMOVAL OF CMP RESIDUE FROM SEMICONDUCTORS USING SUPERCRITICAL CARBON DIOXIDE PROCESS", issued Aug. 21, 2001, which are incorporated by reference.

In another embodiment, rapid expansion of the fluid is employed to introduce the fluid into the decontamination chamber such that the fluid is cooled enough that contaminants fall out within the decontamination chamber, producing a purified fluid. In one embodiment, a nozzle, e.g., a needle valve is employed to introduce the fluid into the decontamination chamber such that the fluid is cooled by expansion and contaminants fall out within the chamber, producing a purified fluid. The purified fluid can be retrieved by any suitable means. Preferably, the purified fluid is then introduced to a filter to reduce a contaminant level of the purified fluid.

FIG. 1 shows an exemplary block diagram of a processing system 100 in accordance with an embodiment of the invention. In the illustrated embodiment, processing system 100 comprises a process module 110, a recirculation system 120, a process chemistry supply system 130, a carbon dioxide supply system 140, a pressure control system 150, an exhaust system 160, and a controller 180. The processing system 100 can operate at pressures that can range from 1000 psi to 10,000 psi. In addition, the processing system 100 can operate at temperatures that can range from 40 to 300 degrees Celsius. The process module 110 can comprise a processing chamber 108.

The details concerning one example of the processing chamber 108 are disclosed in co-owned and co-pending U.S. patent applications Ser. No. 09/912,844, entitled "HIGH PRESSURE PROCESSING CHAMBER FOR SEMICONDUCTOR SUBSTRATE," filed Jul. 24, 2001, Ser. No. 09/970,309, entitled "HIGH PRESSURE PROCESSING CHAMBER FOR MULTIPLE SEMICONDUCTOR SUBSTRATES," filed Oct. 3, 2001, Ser. No. 10/121,791, entitled "HIGH PRESSURE PROCESSING CHAMBER FOR SEMICONDUCTOR SUBSTRATE INCLUDING FLOW ENHANCING FEATURES," filed Apr. 10, 2002, and Ser. No. 10/364,284, entitled "HIGH-PRESSURE PROCESSING CHAMBER FOR A SEMICONDUCTOR WAFER," filed Feb. 10, 2003, the contents of which are incorporated herein by reference.

The controller 180 can be coupled to the process module 110, the recirculation system 120, the process chemistry supply system 130, the carbon dioxide supply system 140, the pressure control system 150, and the exhaust system 160. Alternately, controller 180 can be coupled to one or more additional controllers/computers (not shown), and controller 180 can obtain setup and/or configuration information from an additional controller/computer.

In FIG. 1, optional processing elements (the process module 110, the recirculation system 120, the process chemistry supply system 130, the carbon dioxide supply system 140, the pressure control system 150, the exhaust system 160, and the controller 180) are shown. The processing system 100 can comprise any number of processing elements having any number of controllers associated with them in addition to independent processing elements.

The controller 180 can be used to configure any number of processing elements (the process module 110, the recirculation system 120, the process chemistry supply system 130, the carbon dioxide supply system 140, the pressure control system 150, and the exhaust system 160), and the controller 180 can collect, provide, process, store, and display data from processing elements. The controller 180 can comprise a number of applications for controlling one or more of the processing elements (the process module 110, the recirculation system 120, the process chemistry supply system 130, the carbon dioxide supply system 140, the pressure control system 150, the exhaust system 160). For example, controller 180 can include a GUI component (not shown) that can provide easy to use interfaces that enable a user to monitor and/or control one or more processing elements (the process module 110, the recirculation system 120, the process chemistry supply system 130, the carbon dioxide supply system 140, the pressure control system 150, the exhaust system 160).

The process module 110 can include an upper assembly 112, a frame 114, and a lower assembly 116. The upper assembly 112 can comprise a heater (not shown) for heating the processing chamber 108, a substrate 105, or the processing fluid (not shown), or a combination of two or more thereof. Alternately, a heater is not required. The frame 114 can include means for flowing a processing fluid through the processing chamber 108. In one example, a circular flow pattern can be established, and in another example, a substantially linear flow pattern can be established. Alternately, the means for flowing can be configured differently. The lower assembly 116 can comprise one or more lifters (not shown) for moving a chuck 118 coupled to the lower assembly 116 and/or the substrate 105. Alternately, a lifter is not required.

In one embodiment, the process module 110 can include a holder or the chuck 118 for supporting and holding the substrate 105 while processing the substrate 105. The holder or chuck 118 can also be configured to heat or cool the substrate 105 before, during, and/or after processing the substrate 105. Alternately, the process module 110 can include a platen (not shown) for supporting and holding the substrate 105 while processing the substrate 105.

A transfer system (not shown) can be used to move the substrate 105 into and out of the processing chamber 108 through a slot (not shown). In one example, the slot can be opened and closed by moving the chuck 118, and in another example, the slot can be controlled using a gate valve (not shown).

The substrate 105 can include semiconductor material, metallic material, dielectric material, ceramic material, or polymer material, or a combination of two or more thereof. The semiconductor material can include Si, Ge, Si/Ge, or GaAs. The metallic material can include Cu, Al, Ni, Pb, Ti, Ta, or W, or combinations of two or more thereof. The dielectric material can include Si, O, N, or C, or combinations of two or more thereof. The ceramic material can include Al, N, Si, C, or O, or combinations of two or more thereof.

The recirculation system 120 can be coupled to the process module 110 using one or more inlet lines 122 and one or more outlet lines 124. The recirculation system 120 can comprise one or more valves (not shown) for regulating the flow of a supercritical processing solution through the recirculation system 120 and through the process module 110. The recirculation system 120 can comprise any number of back-flow valves, filters, pumps, and/or heaters (not shown) for maintaining the supercritical processing solution and flowing the supercritical process solution through the recirculation system 120 and through the processing chamber 108 in the process module 110.

Processing system 100 can comprise a process chemistry supply system 130. In the illustrated embodiment, the process chemistry supply system 130 is coupled to the recirculation system 120 using one or more lines 135, but this is not required for the invention. In alternate embodiments, the process chemical supply system 130 can be configured differently and can be coupled to different elements in the processing system 100. For example, the process chemistry supply system 130 can be coupled to the process module 110.

The process chemistry supply system 130 can comprise a cleaning chemistry assembly (not shown) for providing cleaning chemistry for generating supercritical cleaning solutions within the processing chamber 108. The cleaning chemistry can include peroxides and a fluoride source. Further details of fluoride sources and methods of generating supercritical processing solutions with fluoride sources are described in U.S. patent application Ser. No. 10/442,557, filed May 10, 1003, and titled "TETRA-ORGANIC AMMONIUM FLUORIDE AND HF IN SUPERCRITICAL FLUID FOR PHOTORESIST AND RESIDUE REMOVAL", and U.S. patent application Ser. No. 10/321,341, filed Dec. 16, 1002, and titled "FLUORIDE IN SUPERCRITICAL FLUID FOR PHOTORESIST AND RESIDUE REMOVAL," both incorporated by reference herein.

In addition, the cleaning chemistry can include chelating agents, complexing agents, oxidants, organic acids, and inorganic acids that can be introduced into supercritical carbon dioxide with one or more carrier solvents, such as N,N-dimethylacetamide (DMAc), gamma-butyrolactone (BLO), dimethyl sulfoxide (DMSO), ethylene carbonate (EC), N-methylpyrrolidone (NMP), dimethylpiperidone, propylene carbonate, and alcohols (such a methanol, ethanol and 1-propanol).

The process chemistry supply system 130 can comprise a rinsing chemistry assembly (not shown) for providing rinsing chemistry for generating supercritical rinsing solutions within the processing chamber 108. The rinsing chemistry can include one or more organic solvents including, but not limited to, alcohols and ketones. In one embodiment, the rinsing chemistry can comprise sulfolane, also known as thiocyclopenatne-1,1-dioxide, (Cyclo) tetramethylene sulphone and 1,3,4,5-tetrahydrothiophene-1,1-dioxide, which can be purchased from a number of venders, such as Degussa Stanlow Limited, Lake Court, Hursley Winchester SO21 1 LD UK.

The process chemistry supply system 130 can comprise a curing chemistry assembly (not shown) for providing curing chemistry for generating supercritical curing solutions within the processing chamber 108.

The processing system 100 can comprise a carbon dioxide supply system 140. As shown in FIG. 1, the carbon dioxide supply system 140 can be coupled to the process module 110 using one or more lines 145, but this is not required. In alternate embodiments, carbon dioxide supply system 140 can be configured differently and coupled differently. For example, the carbon dioxide supply system 140 can be coupled to the recirculation system 120.

The carbon dioxide supply system 140 can comprise a carbon dioxide source (not shown) and a plurality of flow control elements (not shown) for generating a supercritical fluid. For example, the carbon dioxide source can include a $CO_2$ feed system (not shown), and the flow control elements can include supply lines, valves, filters, pumps, and heaters (not shown). The carbon dioxide supply system 140 can comprise an inlet valve (not shown) that is configured to open and close to allow or prevent the stream of supercritical carbon dioxide from flowing into the processing chamber 108. For example, controller 180 can be used to determine fluid parameters such as pressure, temperature, process time, and flow rate.

The carbon dioxide supply system 140 can comprise a decontamination system 142 for removing contaminants from the carbon dioxide supplied by the carbon dioxide supply system 140. Temperature and/or pressures changes along with filtering can be used to remove contaminants and produce a purified fluid.

The processing system 100 can also comprise a pressure control system 150. As shown in FIG. 1, the pressure control system 150 can be coupled to the process module 110 using one or more lines 155, but this is not required. In alternate embodiments, pressure control system 150 can be configured differently and coupled differently. The pressure control system 150 can include one or more pressure valves (not shown) for exhausting the processing chamber 108 and/or for regulating the pressure within the processing chamber 108. Alternately, the pressure control system 150 can also include one or more pumps (not shown). For example, one pump may be used to increase the pressure within the processing chamber 108, and another pump may be used to evacuate the processing chamber 108. In another embodiment, the pressure control system 150 can comprise means for sealing the processing chamber 108. In addition, the pressure control system 150 can comprise means for raising and lowering the substrate 105 and/or the chuck 118.

Furthermore, the processing system 100 can comprise an exhaust system 160. As shown in FIG. 1, the exhaust system 160 can be coupled to the process module 110 using one or more lines 165, but this is not required. In alternate embodiments, exhaust system 160 can be configured differently and coupled differently. The exhaust system 160 can include an exhaust gas collection vessel (not shown) and can be used to remove contaminants from the processing fluid. Alternately, the exhaust system 160 can be used to recycle the processing fluid.

Controller 180 can use pre-process data, process data, and post-process data. For example, pre-process data can be associated with an incoming substrate. This pre-process data can include lot data, batch data, run data, composition data, and history data. The pre-process data can be used to establish an input state for a wafer. Process data can include process parameters. Post processing data can be associated with a processed substrate.

The controller 180 can use the pre-process data to predict, select, or calculate a set of process parameters to use to process the substrate 105. For example, this predicted set of process parameters can be a first estimate of a process recipe. A process model can provide the relationship between one or more process recipe parameters or set points and one or more process results. A process recipe can include a multi-step process involving a set of process modules. Post-process data can be obtained at some point after the substrate 105 has been processed. For example, post-process data can be obtained after a time delay that can vary from minutes to days. The controller 180 can compute a predicted state for the substrate 105 based on the pre-process data, the process characteristics, and a process model. For example, a cleaning rate model can be used along with a contaminant level to compute a predicted cleaning time. Alternately, a rinse rate model can be used along with a contaminant level to compute a processing time for a rinse process.

The controller 180 can be used to monitor and/or control the level of the contaminants in the incoming fluids and/or gases, in the processing fluids and/or gasses, and in the exhaust fluids and/or gases. For example, controller 180 can determine when the decontamination system 142 operates.

It will be appreciated that the controller 180 can perform other functions in addition to those discussed here. The controller 180 can monitor the pressure, temperature, flow, or other variables associated with the processing system 100 and take actions based on these values. The controller 180 can process measured data, display data and/or results on a GUI screen (not shown), determine a fault condition, determine a response to a fault condition, and alert an operator. For example, controller 180 can process contaminant level data, display the data and/or results on a GUI screen, determine a fault condition, such as a high level of contaminants, determine a response to the fault condition, and alert an operator (send an email and/or a page) that the contaminant level is approaching a limit or is above a limit. The controller 180 can comprise a database component (not shown) for storing input data, process data, and output data.

In a supercritical cleaning/rinsing process, the desired process result can be a process result that is measurable using an optical measuring device (not shown). For example, the desired process result can be an amount of contaminant in a via or on the surface of the substrate 105. After each cleaning process run, the desired process result can be measured.

Figure 2:
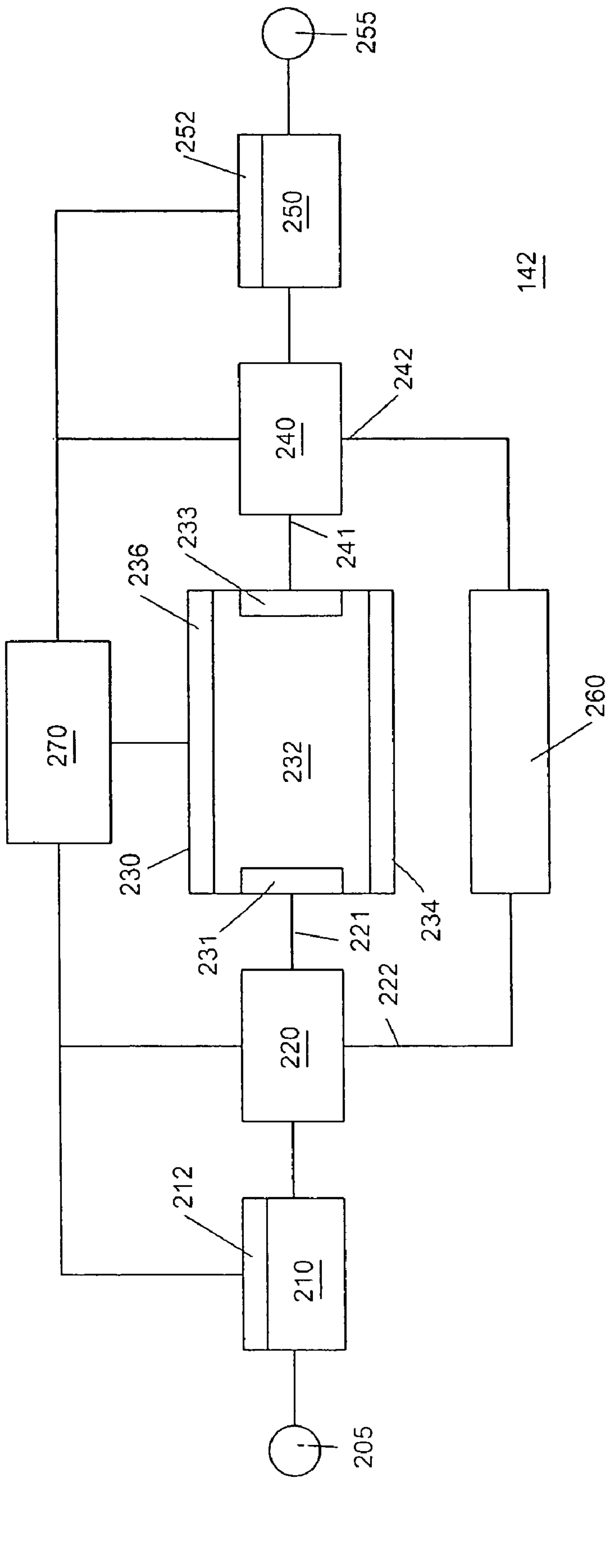
FIG. 2 illustrates a simplified block diagram of a decontamination system in accordance with an embodiment of the invention.

FIG. 2 illustrates a simplified block diagram of the decontamination system 142 in accordance with an embodiment of the invention. In the illustrated embodiment, the decontamination system 142 includes an input element 205, a first filter element 210, a first flow control element 220, a decontamination module 230, a second flow control element 240, a second filter element 250, a bypass element 260, a controller 270, and an output element 255. In alternate embodiments, different configurations can be used. For example, one or more of the filter elements may not be required.

Input element 205 can be used to couple the decontamination system 142 to a fluid supply source (not shown) and can be used to control the flow into the decontamination system 142. For example, the fluid supply source may include a storage tank (not shown). The input element 205 can be coupled to the first filter element 210. Alternately, input element 205 and/or the first filter element 210 may not be required. In other embodiments, the input element 205 may include heaters, valves, pumps, sensors, couplings, filters, and/or pipes (not shown).

In one embodiment, the first filter element 210 can comprise a fine filter and a coarse filter (not shown). For example, the fine filter can be configured to filter 0.05 micron and larger particles, and the coarse filter can be configured to filter 2-3 micron and larger particles. In addition, the first filter element 210 can comprise a first measuring device 212 that can be used for measuring flow through the first filter element 210. Controller 270 can be coupled to the first filter element 210 and can be used to monitor the flow through the first filter element 210. Alternately, a different number of filters may be used, and controller 270 can be used to determine when to use the coarse filter, when to use the fine filter, when to use a combination of filters, and when a filter is not required. In alternate embodiments, first filter element 210 may include heaters, valves, pumps, switches, sensors, couplings, and/or pipes (not shown).

In one embodiment, the first flow control element 220 can comprise a fluid switch (not shown) for controlling the output from the first flow control element 220. The first flow control element 220 can comprise two outputs 221 and 222. In one case, the first output 221 can be coupled to the decontamination module 230, and the second output 222 can be coupled to the bypass element 260. Controller 270 can be coupled to the first flow control element 220 and it can be used to determine which output of the two outputs 221 and 222 is used. In an alternate embodiment, the first flow control element 220 may include temperature, pressure, and/or flow sensors (not shown). In other embodiments, first flow control element 220 may include heaters, valves, pumps, couplings, and/or pipes (not shown).

The decontamination module 230 can include a chamber 232, a temperature control subsystem 234 coupled to the chamber 232, and a pressure control subsystem 236 coupled to the chamber 232. In addition, the decontamination module 230 can include an input device 231 and an output device 233.

The input device 231 can include means for introducing a fluid stream (not shown) into the chamber 232 and can comprise means for vaporizing the fluid stream into the chamber 232. The means for vaporizing the fluid stream into the chamber 232 can comprise means for expanding the fluid stream into the chamber 232. For example, the means for expanding the fluid stream into the chamber 232 can comprise a needle value (not shown).

In one embodiment, the temperature control subsystem 234 can be used for controlling the temperature of the chamber 232 and the temperature of the fluid in the chamber 232. The fluid can be introduced into the chamber 232 and cooled. The cooling process can cause the contaminants to "fall out" of the fluid within the chamber 232, producing a purified fluid. The purified fluid can be removed from the chamber 232 using the output device 233. The temperature control subsystem 234 can include a heater (not shown) and/or a cooling device (not shown).

In another embodiment, the pressure control subsystem 236 can be used for controlling the pressure of the chamber 232 and the pressure of the fluid in the chamber 232. The fluid can be introduced into the chamber 232 and chamber pressure can be lowered. The pressure change can cause the contaminants to "fall out" of the fluid within the chamber 232, producing a purified fluid. The purified fluid can be removed from the chamber 232 using the output device 233.

In another embodiment, the temperature control subsystem 234 and the pressure control subsystem 236 can both be used to produce a purified fluid. Controller 270 can determine the temperature and pressure to use.

The output device 233 can include means for directing a purified fluid stream out of the chamber 232 and can comprise means for increasing the pressure of the purified fluid stream from the chamber 232. The means for increasing the pressure of the purified fluid stream from the chamber 232 can comprise means for compressing the fluid stream. For example, the means for increasing the pressure of the purified fluid stream out of the chamber 232 can comprise a pump (not shown).

In the illustrated embodiment, a bypass element 260 is shown, but this is not required for the invention. In an alternate embodiment, the bypass element 260 and an associated bypass path (not shown) may not be required. The controller 270 can determine that the fluid does not need to be decontaminated and the bypass path can be selected. In alternate embodiments, bypass element 260 may include heaters, valves, sensors, pumps, couplings, and/or pipes (not shown).

In one embodiment, the second flow control element 240 can comprise a fluid switch (not shown) for controlling the output from the decontamination module 230 and the bypass element 260. The second flow control element 240 can comprise two inputs 241 and 242. In one case, the first input 241 can be coupled to the decontamination module 230, and the second input 242 can be coupled to the bypass element 260. Controller 270 can be coupled to the second flow control element 240 and it can be used to determine which input is used. In an alternate embodiment, the second flow control element 240 may include temperature, pressure, and/or flow sensors (not shown). In other embodiments, second control element 240 may include heaters, valves, pumps, couplings, and/or pipes (not shown).

In one embodiment, the second filter element 250 can comprises a fine filter and a coarse filter (not shown). For example, the fine filter can be configured to filter 0.05 micron and larger particles, and the coarse filter can be configured to filter 2-3 micron and larger particles. Alternately, a different number of filters may be used. In addition, the second filter element 250 can comprise a measuring device 252 that can be used for measuring flow through the second filter element 250. Controller 270 can be coupled to the second filter element 250 and can be used to monitor the flow through the second filter element 250. In alternate embodiments, second filter element 250 may include heaters, valves, pumps, sensors, couplings, and/or pipes (not shown).

Output element 255 can be used to couple the decontamination system 142 to a processing chamber (not shown) and can be used to control the flow from the decontamination system 142. For example, the processing chamber may include a supercritical processing chamber (not shown). The output element 255 can be coupled to the second filter element 250. Alternately, output element 255 and/or the second filter element 250 may not be required. In other embodiments, the output element 255 may include heaters, valves, pumps, sensors, couplings, filters, and/or pipes (not shown).

The decontamination system 142 can have an operating pressure up to 10,000 psi, and an operating temperature up to 300 degrees Celsius. The decontamination system 142 can be used to provide a temperature controlled supercritical fluid that can include purified supercritical carbon dioxide. In an alternate embodiment, the decontamination system 142 may be used to provide a temperature controlled supercritical fluid that can include supercritical carbon dioxide admixed with process chemistry.

Controller 270 can be used to control the decontamination system 142, and controller 270 can be coupled to controller 180 of the processing system 100 (FIG. 1). Alternately, controller 270 of the decontamination system 142 may not be required. For example, controller 180 of the processing system 100 (FIG. 1) may be used to control the decontamination system 142.

Controller 270 can be used to determine and control the temperature of the fluid entering the chamber 232, the temperature of the fluid in the chamber 232, the temperature of the fluid exiting the chamber 232, and the temperature of the fluid from the output element 255 of the decontamination system 142.

During substrate processing, providing processing fluids that are contaminated or at an incorrect temperature can have a negative affect on the process. For example, an incorrect temperature can affect the process chemistry, process dropout, and process uniformity. In one embodiment, the decontamination system 142 is coupled with the recirculation loop 115 (FIG. 1) during a major portion of the substrate processing so that the impact of temperature on the process is minimized.

In another embodiment, decontamination system 142 can be used during a maintenance or system cleaning operation in which cleaning chemistry is used to remove process by-products and/or particles from the interior surfaces of the decontamination system 142. This is a preventative maintenance operation in which maintaining low contaminant levels and correct temperatures prevents material from adhering to the interior surfaces of the decontamination system 142 that can be dislodged later during processing and that can cause unwanted particle deposition on a substrate.

Figure 3:
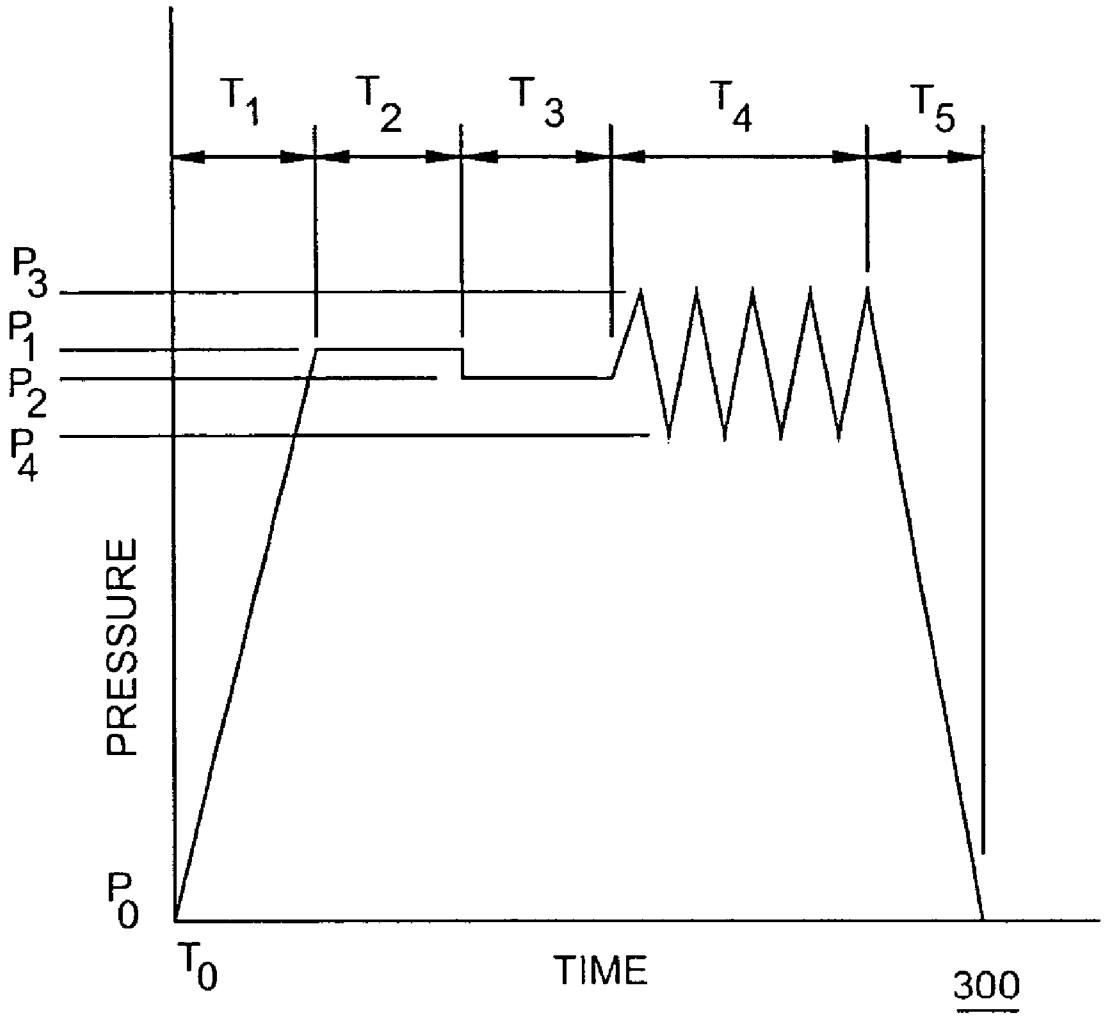
FIG. 3 illustrates an exemplary graph of pressure versus time for a supercritical process in accordance with an embodiment of the invention.

FIG. 3 illustrates an exemplary graph 300 of pressure versus time for a supercritical process step in accordance with an embodiment of the invention. In the illustrated embodiment, the graph 300 of pressure versus time is shown, and the graph 300 can be used to represent a supercritical cleaning process step, a supercritical rinsing process step, or a supercritical curing process step, or a combination thereof. Alternately, different pressures, different timing, and different sequences may be used for different processes.

Now referring to both FIGS. 1, 2, and 3, prior to an initial time $T_0$, the substrate 105 to be processed can be placed within the processing chamber 108 and the processing chamber 108 can be sealed. For example, during cleaning and/or rinsing processes, the substrate 105 can have post-etch and/or post-ash residue thereon. The substrate 105, the processing chamber 108, and the other elements in the recirculation loop 115 (FIG.1) can be heated to an operational temperature. For example, the operational temperature can range from 40 to 300 degrees Celsius. For example, the processing chamber 108, the recirculation system 120, and piping (not shown) coupling the recirculation system 120 to the processing chamber 108 can form the recirculation loop 115.

From the initial time $T_0$ through a first time $T_1$, the elements in the recirculation loop 115 (FIG.1) can be pressurized, beginning with an initial pressure $P_0$. During a first portion of the time $T_1$, the decontamination system 142 can be coupled into the flow path and can be used to provide temperature controlled purified fluid into the processing chamber 108 and/or other elements in the recirculation loop 115 (FIG. 1).

In one embodiment, the decontamination system 142 can be operated during a pressurization process and can be used to fill the recirculation loop 115 (FIG. 1) with temperature-controlled purified fluid. The decontamination system 142 can comprise means for filling the recirculation loop 115 with the temperature-controlled purified fluid, and the temperature variation of the temperature-controlled purified fluid can be controlled to be less than approximately 10 degrees Celsius during the pressurization process. Alternately, the temperature variation of the temperature-controlled purified fluid can be controlled to be less than approximately 5 degrees Celsius during the pressurization process.

For example, a purified supercritical fluid, such as purified supercritical $CO_2$, can be used to pressurize the processing chamber 108 and the other elements in the recirculation loop 115 (FIG. 1). During time $T_1$, a pump (not shown) in the recirculation system 120 (FIG. 1) can be started and can be used to circulate the temperature controlled fluid through the processing chamber 108 and the other elements in the recirculation loop 115 (FIG. 1).

In one embodiment, when the pressure in the processing chamber 108 exceeds a critical pressure Pc (1,070 psi), process chemistry can be injected into the processing chamber 108, using the process chemistry supply system 130. In one embodiment, the decontamination system 142 can be switched off before the process chemistry is injected. Alternately, the decontamination system 142 can be switched on while the process chemistry is injected.

In other embodiments, process chemistry may be injected into the processing chamber 108 before the pressure exceeds the critical pressure Pc (1,070 psi) using the process chemistry supply system 130. For example, the injection(s) of the process chemistries can begin upon reaching about 1100-1200 psi. In other embodiments, process chemistry is not injected during the $T_1$ period.

In one embodiment, process chemistry is injected in a linear fashion, and the injection time can be based on a recirculation time. For example, the recirculation time can be determined based on the length of a recirculation path (not shown) and a flow rate. In other embodiments, process chemistry may be injected in a non-linear fashion. For example, process chemistry can be injected in one or more steps.

The process chemistry can include a cleaning agent, a rinsing agent, or a curing agent, or a combination thereof that is injected into the supercritical fluid. One or more injections of process chemistries can be performed over the duration of the first time $T_1$ to generate a supercritical processing solution with the desired concentrations of chemicals. The process chemistry, in accordance with the embodiments of the invention, can also include one more or more carrier solvents.

Still referring to both FIGS. 1, 2, and 3, during a second time $T_2$, the supercritical processing solution can be re-circulated over the substrate 105 and through the processing chamber 108 using the recirculation system 120, such as described above. In one embodiment, the decontamination system 142 can be switched off, and process chemistry is not injected during the second time $T_2$. Alternatively, the decontamination system 142 can be switched on, and process chemistry may be injected into the processing chamber 108 during the second time $T_2$ or after the second time $T_2$.

The processing chamber 108 can operate at a pressure above 1,500 psi during the second time $T_2$. For example, the pressure can range from approximately 2,500 psi to approximately 3,100 psi, but can be any value so long as the operating pressure is sufficient to maintain supercritical conditions. The supercritical processing solution is circulated over the substrate 105 and through the processing chamber 108 using the recirculation system 120, such as described above. The supercritical conditions within the processing chamber 108 and the other elements in the recirculation loop 115 (FIG.1) are maintained during the second time $T_2$, and the supercritical processing solution continues to be circulated over the substrate 105 and through the processing chamber 108 and the other elements in the recirculation loop 115 (FIG.1). The recirculation system 120 (FIG. 1), can be used to regulate the flow of the supercritical processing solution through the processing chamber 108 and the other elements in the recirculation loop 115 (FIG.1).

Still referring to both FIGS. 1, 2, and 3, during a third time $T_3$, one or more push-through processes can be performed. The decontamination system 142 can comprise means for providing a first volume of temperature-controlled purified fluid during a push-through process, and the first volume can be larger than the volume of the recirculation loop 115. Alternately, the first volume can be less than or approximately equal to the volume of the recirculation loop 115. In addition, the temperature differential within the first volume of temperature-controlled purified fluid during the push-through process can be controlled to be less than approximately 10 degrees Celsius. Alternately, the temperature variation of the temperature-controlled purified fluid can be controlled to be less than approximately 5 degrees Celsius during a push-through process.

In other embodiments, the decontamination system 142 can comprise means for providing one or more volumes of temperature controlled purified fluid during a push-through process; each volume can be larger than the volume of the processing chamber 108 or the volume of the recirculation loop 115; and the temperature variation associated with each volume can be controlled to be less than 10 degrees Celsius.

For example, during the third time $T_3$, one or more volumes of temperature controlled purified supercritical carbon dioxide can be introduced into the processing chamber 108 and the other elements in the recirculation loop 115 from the decontamination system 142, and the supercritical cleaning solution along with process residue suspended or dissolved therein can be displaced from the processing chamber 108 and the other elements in the recirculation loop 115 through the exhaust system 160. In an alternate embodiment, purified supercritical carbon dioxide can be fed into the recirculation system 120 from the decontamination system 142, and the supercritical cleaning solution along with process residue suspended or dissolved therein can also be displaced from the processing chamber 108 and the other elements in the recirculation loop 115 through the exhaust system 160.

Providing temperature-controlled purified fluid during the push-through process prevents process residue suspended or dissolved within the fluid being displaced from the processing chamber 108 and the other elements in the recirculation loop 115 from dropping out and/or adhering to the processing chamber 108 and the other elements in the recirculation loop 115. In addition, during the third time $T_3$, the temperature of the purified fluid supplied by the decontamination system 142 can vary over a wider temperature range than the range used during the second time $T_2$.

In the illustrated embodiment shown in FIG. 3, the second time $T_2$ is followed by the third time $T_3$, but this is not required. In alternate embodiments, other time sequences may be used to process the substrate 105.

After the push-through process is complete, a pressure cycling process can be performed. Alternately, one or more pressure cycles can occur during the push-through process. In other embodiments, a pressure cycling process is not required. During a fourth time $T_4$, the processing chamber 108 can be cycled through a plurality of decompression and compression cycles. The pressure can be cycled between a first pressure $P_3$ and a second pressure $P_4$ one or more times. In alternate embodiments, the first pressure $P_3$ and a second pressure $P_4$ can vary. In one embodiment, the pressure can be lowered by venting through the exhaust system 160. For example, this can be accomplished by lowering the pressure to below approximately 1,500 psi and raising the pressure to above approximately 2,500 psi. The pressure can be increased by using the decontamination system 142 to provide additional high-pressure purified fluid.

The decontamination system 142 can comprise means for providing a first volume of temperature-controlled purified fluid during a compression cycle, and the first volume can be larger than the volume of the recirculation loop 115. Alternately, the first volume can be less than or approximately equal to the volume of the recirculation loop 115. In addition, the temperature differential within the first volume of temperature-controlled purified fluid during the compression cycle can be controlled to be less than approximately 10 degrees Celsius. Alternately, the temperature variation of the temperature-controlled purified fluid can be controlled to be less than approximately 5 degrees Celsius during a compression cycle.

In addition, the decontamination system 142 can comprise means for providing a second volume of temperature-controlled purified fluid during a decompression cycle, and the second volume can be larger than the volume of the recirculation loop 115. Alternately, the second volume can be less than or approximately equal to the volume of the recirculation loop 115. In addition, the temperature differential within the second volume of temperature-controlled purified fluid during the decompression cycle can be controlled to be less than approximately 10 degrees Celsius. Alternately, the temperature variation of the temperature-controlled purified fluid can be controlled to be less than approximately 5 degrees Celsius during a decompression cycle.

In other embodiments, the decontamination system 142 can comprise means for providing one or more volumes of temperature controlled purified fluid during a compression cycle and/or decompression cycle; each volume can be larger than the volume of the processing chamber 108 or the volume of the recirculation loop 115; the temperature variation associated with each volume can be controlled to be less than 10 degrees Celsius; and the temperature variation can be allowed to increase as additional cycles are performed.

Furthermore, during the fourth time $T_4$, one or more volumes of temperature controlled purified supercritical carbon dioxide can be fed into the processing chamber 108 and the other elements in the recirculation loop 115 from the decontamination system 142, and the supercritical cleaning solution along with process residue suspended or dissolved therein can be displaced from the processing chamber 108 and the other elements in the recirculation loop 115 through the exhaust control system 160. In an alternate embodiment, the purified supercritical carbon dioxide can be introduced into the recirculation system 120 from the decontamination system 142, and the supercritical cleaning solution along with process residue suspended or dissolved therein can also be displaced from the processing chamber 108 and the other elements in the recirculation loop 115 through the exhaust system 160.

Providing temperature-controlled purified fluid during the pressure cycling process prevents process residue suspended or dissolved within the fluid being displaced from the processing chamber 108 and the other elements in the recirculation loop 115 from dropping out and/or adhering to the processing chamber 108 and the other elements in the recirculation loop 115. In addition, during the fourth time $T_4$, the temperature of the purified fluid supplied by the decontamination system 142 can vary over a wider temperature range than the range used during the second time $T_2$.

In the illustrated embodiment shown in FIG. 3, the third time $T_3$ is followed by the fourth time $T_4$, but this is not required. In alternate embodiments, other time sequences may be used to process the substrate 105.

In an alternate embodiment, the decontamination system 142 can be switched off during a portion of the fourth time $T_4$. For example, the decontamination system 142 can be switched off during a decompression cycle.

During a fifth time $T_5$, the processing chamber 108 can be returned to lower pressure. For example, after the pressure cycling process is completed, then the processing chamber 108 can be vented or exhausted to atmospheric pressure.

The decontamination system 142 can comprise means for providing a volume of temperature-controlled purified fluid during a venting process, and the volume can be larger than a volume of the recirculation loop 115. Alternately, the volume can be less than or approximately equal to the volume of the recirculation loop 115. In addition, the temperature differential within the volume of temperature-controlled purified fluid during the venting process can be controlled to be less than approximately 20 degrees Celsius. Alternately, the temperature variation of the temperature-controlled purified fluid can be controlled to be less than approximately 15 degrees Celsius during a venting process.

In other embodiments, the decontamination system 142 can comprise means for providing one or more volumes of temperature controlled purified fluid during a venting process; each volume can be larger than the volume of the processing chamber 108 or the volume of the recirculation loop 115; the temperature variation associated with each volume can be controlled to be less than 20 degrees Celsius; and the temperature variation can be allowed to increase as the pressure approaches a final pressure.

Furthermore, during the fifth time $T_5$, one or more volumes of temperature controlled purified supercritical carbon dioxide can be added into the processing chamber 108 and the other elements in the recirculation loop 115 from the decontamination system 142, and the remaining supercritical cleaning solution along with process residue suspended or dissolved therein can be displaced from the processing chamber 108 and the other elements in the recirculation loop 115 through the exhaust system 160. In an alternate embodiment, the purified supercritical carbon dioxide can be introduced into the recirculation system 120 from the decontamination system 142, and the remaining supercritical cleaning solution along with process residue suspended or dissolved therein can also be displaced from the processing chamber 108 and the other elements in the recirculation loop 115 through the exhaust system 160.

Providing temperature-controlled purified fluid during the venting process prevents process residue suspended or dissolved within the fluid being displaced from the processing chamber 108 and the other elements in the recirculation loop 115 from dropping out and/or adhering to the processing chamber 108 and the other elements in the recirculation loop 115.

In the illustrated embodiment shown in FIG. 3, the fourth time $T_4$ is followed by the fifth time $T_5$, but this is not required. In alternate embodiments, other time sequences may be used to process the substrate 105.

In one embodiment, during a portion of the fifth time $T_5$, the decontamination system 142 can be switched off. In addition, the temperature of the purified fluid supplied by the decontamination system 142 can vary over a wider temperature range than the range used during the second time $T_2$. For example, the temperature can range below the temperature required for supercritical operation.

For substrate processing, the chamber pressure can be made substantially equal to the pressure inside of a transfer chamber (not shown) coupled to the processing chamber 108. In one embodiment, the substrate 105 can be moved from the processing chamber 108 into the transfer chamber, and moved to a second process apparatus or module (not shown) to continue processing.

In the illustrated embodiment shown in FIG. 3, the pressure returns to the initial pressure $P_0$, but this is not required for the invention. In alternate embodiments, the pressure does not have to return to $P_0$, and the process sequence can continue with additional time steps such as those shown in times $T_1$, $T_2$, $T_3$, $T_4$, or $T_5$ The graph 300 is provided for exemplary purposes only. It will be understood by those skilled in the art that a supercritical processing step can have any number of different time/pressures or temperature profiles without departing from the scope of the invention. Further, any number of cleaning, rinsing, and/or curing process sequences with each step having any number of compression and decompression cycles are contemplated. In addition, as stated previously, concentrations of various chemicals and species within a supercritical processing solution can be readily tailored for the application at hand and altered at any time within a supercritical processing step.

Figure 4:
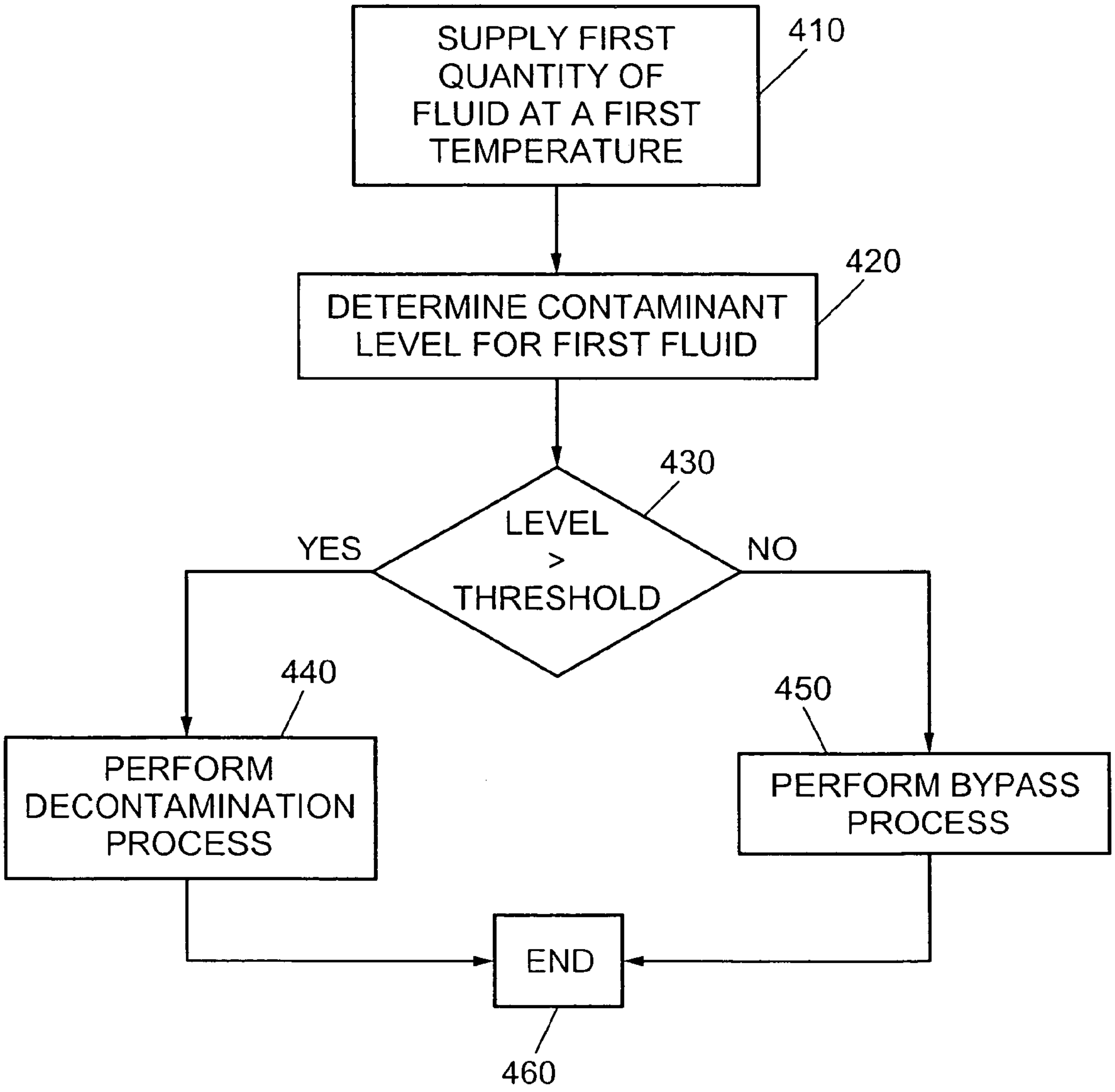
FIG. 4 illustrates a flow diagram of a method of operating a decontamination system in accordance with an embodiment of the invention.

FIG. 4 illustrates a flow diagram of a method of operating a decontamination system in accordance with an embodiment of the invention. In the illustrated embodiment, a procedure 400 having three steps is shown, but this is not required for the invention. Alternately, a different number of steps and/or different types of processes may be included.

In a step 410, a first quantity of fluid at a first temperature can be supplied to the decontamination system. For example, the first quantity of fluid at the first temperature can be supplied to an input device.

In a step 420, a contaminant level can be determined for the first quantity of fluid.

In a step 430, a query can be performed to determine if the contaminant level is above a threshold value. When the contaminant level is above a threshold value, procedure 400 branches to a step 440, and when the contaminant level is equal to or below the threshold value, procedure 400 branches to a step 450.

In a step 440, a decontamination process can be performed. During the decontamination process, a process conditions such as temperature and/or pressure can be determined based on the contaminant level. A temperature and/or pressure can be established in the decontamination chamber to cause a portion of the contaminants within the fluid to drop out of solution thereby creating a purified fluid.

In a step 450, a bypass process can be performed.

In a step 460, procedure 400 can end.

The contaminant level can be measured at the input of the decontamination system, at a filter input, at a filter output, at a chamber input, within a chamber, at a chamber output, or at the output of the decontamination system, or at a combination thereof. In an alternate embodiment, the contaminant level can be calculated and/or modeled.

While the invention has been described in terms of specific embodiments incorporating details to facilitate the understanding of the principles of construction and operation of the invention, such reference herein to specific embodiments and details thereof is not intended to limit the scope of the claims appended hereto. It will be apparent to those skilled in the art that modifications may be made in the embodiments chosen for illustration without departing from the spirit and scope of the invention.

What is claimed is:

1. A decontamination system for providing a purified temperature controlled fluid, comprising:
- a first filter element;
- a first flow control element coupled to the first filter element;
- a decontamination module coupled to the first flow control element;
- a bypass element; coupled to the first flow control element
- a second flow control element coupled to the decontamination module and coupled to the bypass element;
- a second filter element coupled to the second flow control element; and
- a controller coupled to the first filter element, coupled to the first flow control element, coupled to the decontamination module, coupled to the second flow control element, coupled to the second filter element, wherein the controller comprises means for determining a contaminant level for a first fluid entering the decontamination system, means for comparing the contaminant level to a threshold value, and means for diverting the first fluid to the decontamination module when the contaminant level is greater than the threshold value and to the bypass element when the contaminant level is less than or equal to the threshold value.

2. The decontamination system as claimed in claim 1, wherein the first filter element comprises a coarse filter, or a fine filter, or a combination thereof.

3. The decontamination system as claimed in claim 2, wherein the controller comprises means for determining when to use the coarse filter, or the fine filter, or the combination thereof.

4. The decontamination system as claimed in claim 1, wherein the first flow control element comprises a fluid switch for establishing a first path through the first flow control element when the contaminant level is greater than the threshold value and for establishing a second path through the first flow control element when the contaminant level is less than or equal to the threshold value.

5. The decontamination system as claimed in claim 4, wherein the controller comprises means for determining when to use the first path and when to use the second path.

6. The decontamination system as claimed in claim 1, wherein the first flow control element comprises a temperature sensor, a pressure sensor, or a flow sensor, or a combination thereof 7. The decontamination system as claimed in claim 1, wherein the decontamination module comprises:

a chamber having an input device and an output device coupled thereto; and a temperature control subsystem coupled to the chamber.

8. The decontamination system as claimed in claim 7, wherein the input device comprises means for vaporizing a fluid entering the input device.

9. The decontamination system as claimed in claim 7, wherein the input device comprises a needle valve.

10. The decontamination system as claimed in claim 7, wherein the decontamination module further comprises a pressure control subsystem coupled to the chamber.

11. The decontamination system as claimed in claim 1, wherein the second filter element comprises a coarse filter, or a fine filter, or a combination thereof.

12. The decontamination system as claimed in claim 11, wherein the controller comprises means for determining when to use the coarse filter, or the fine filter, or the combination thereof.

13. The decontamination system as claimed in claim 1, wherein the second flow control element comprises a fluid switch for establishing a first path through the second flow control element when the contaminant level is greater than the threshold value and for establishing a second path through the second flow control element when the contaminant level is less than or equal to the threshold value.

14. The decontamination system as claimed in claim 13, wherein the controller comprises means for determining when to use the first path and when to use the second path.

15. The decontamination system as claimed in claim 1, wherein the second flow control element comprises a temperature sensor, a pressure sensor, or a flow sensor, or a combination thereof.

16. The decontamination system as claimed in claim 1, further comprising a fluid source for supplying a first quantity of the first fluid at a first temperature.

17. The decontamination system as claimed in claim 16, wherein the first fluid comprises gaseous, liquid, supercritical, or near-supercritical carbon dioxide, or a combination of two or more thereof.

18. The decontamination system as claimed in claim 17, wherein the first fluid comprises a solvent, a co-solvent, or a surfactant, or a combination of two or more thereof.

19. The decontamination system as claimed in claim 16, wherein the fluid source comprises contaminated $CO_2$.

* * * * *

UNITED STATES PATENT AND TRADEMARK OFFICE

CERTIFICATE OF CORRECTION

PATENT NO. : 7,550,075 B2
APPLICATION NO. : 11/088339
DATED : June 23, 2009
INVENTOR(S) : Bertram et al.

It is certified that error appears in the above-identified patent and that said Letters Patent is hereby corrected as shown below:

In Claim 1 at column 16, line 23, please replace “a bypass element; coupled to the first flow control element” with -- a bypass element coupled to the first flow control element; --

In Claim 6 at column 16, lines 64-67, please add a -- . -- at the end of the claim so that it reads:

> 6. The decontamination system as claimed in claim 1, wherein the first flow control element comprises a temperature sensor, a pressure sensor, or a flow sensor, or a combination thereof.

Signed and Sealed this

Fifteenth Day of September, 2009

David J. Kappos

*Director of the United States Patent and Trademark Office*